Jan. 16, 1934.  E. WESSMAN  1,943,648
AUTOMOBILE BED
Filed July 30, 1932  3 Sheets-Sheet 2
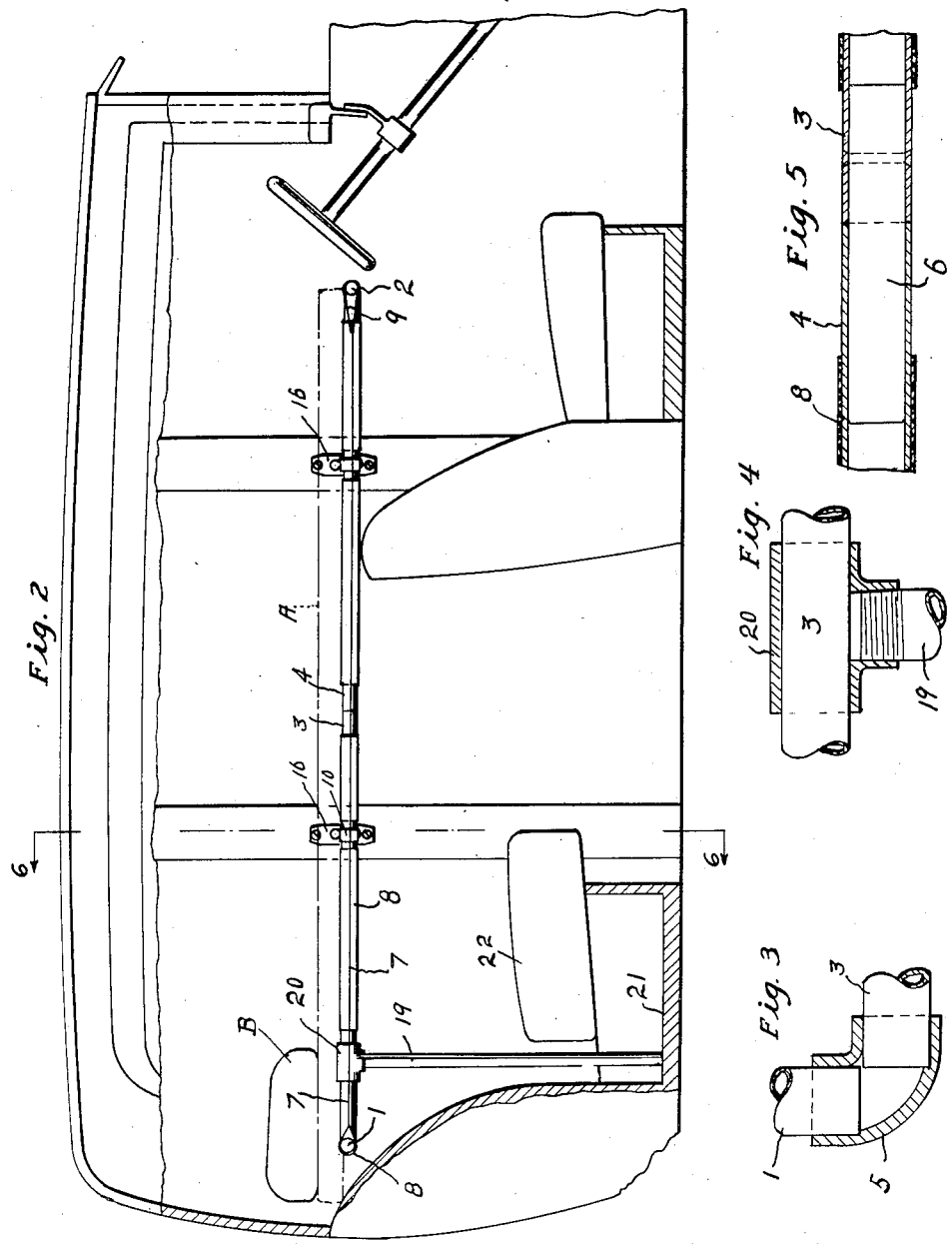
INVENTOR.
Edwin Wessman
BY Wm. F. Freudenreich
ATTORNEY.

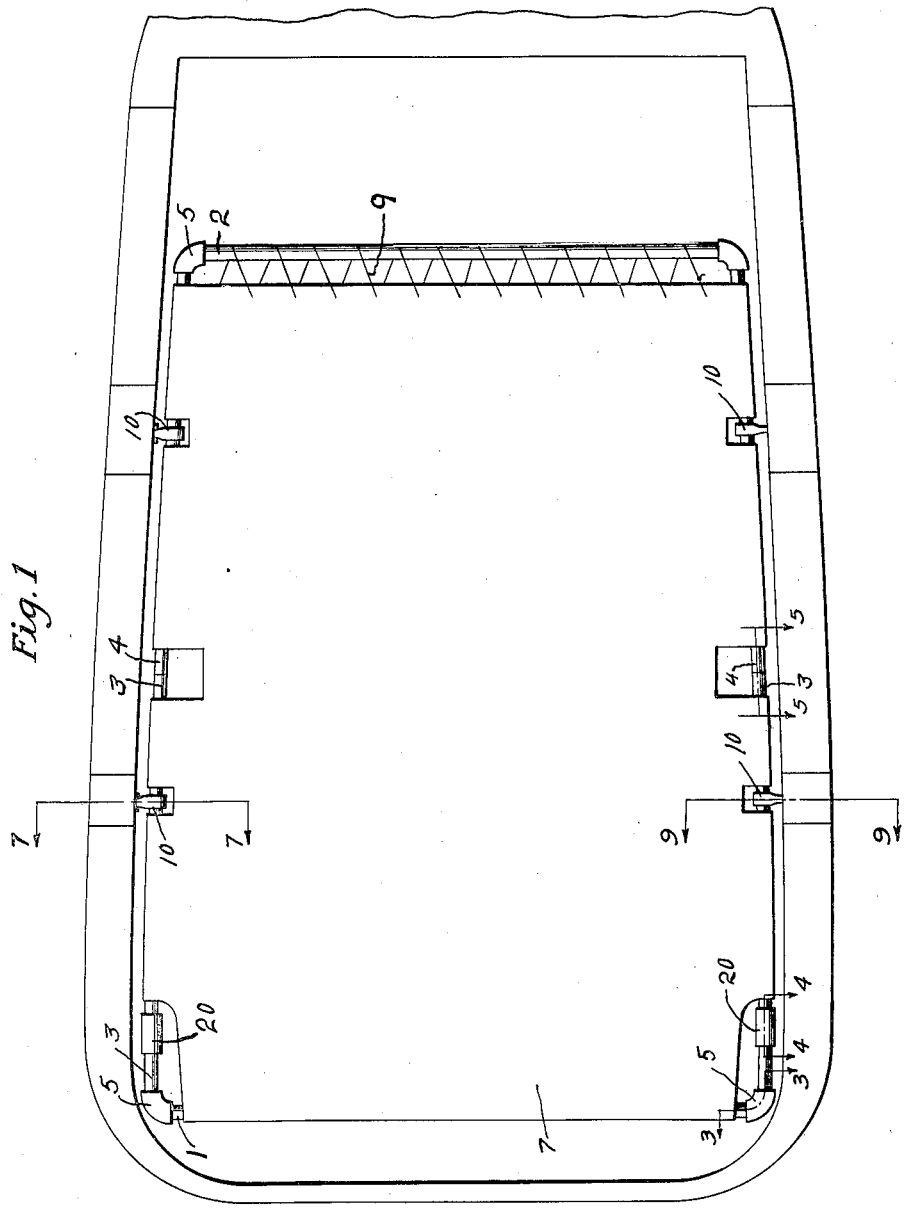

Jan. 16, 1934.  E. WESSMAN  1,943,648
AUTOMOBILE BED
Filed July 30, 1932  3 Sheets-Sheet 3
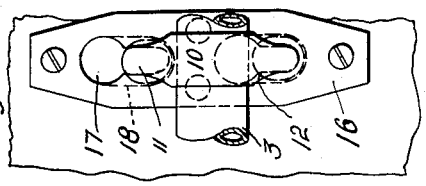
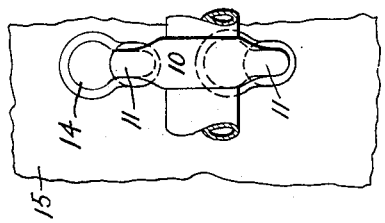
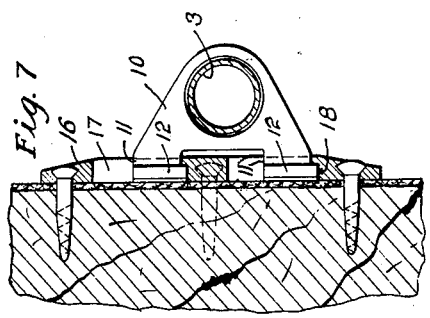
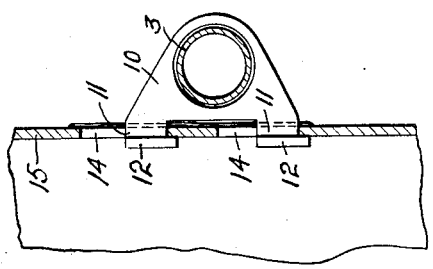
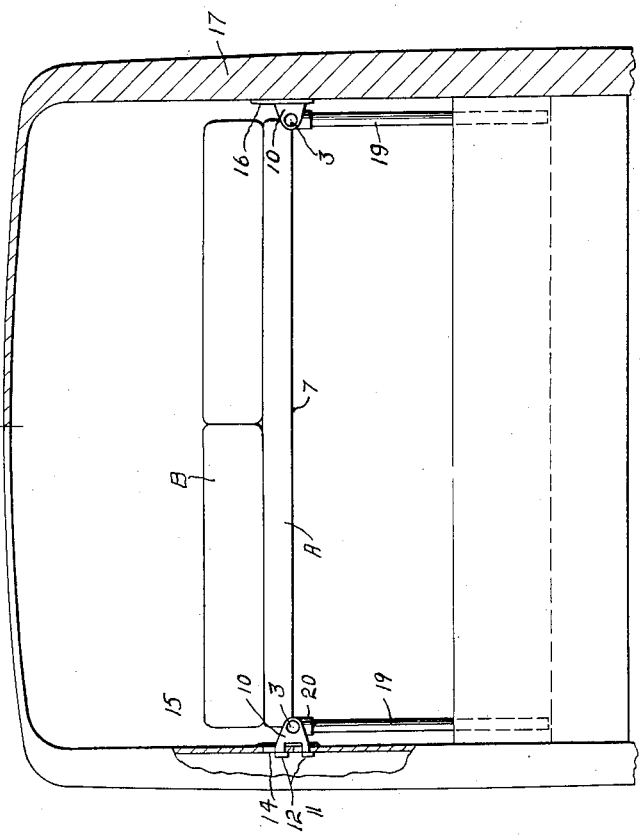
INVENTOR:
Edwin Wessman.
BY Wm. F. Freudenreich,
ATTORNEY.

Patented Jan. 16, 1934

1,943,648

UNITED STATES PATENT OFFICE 1,943,648

AUTOMOBILE BED

Edwin Wessman, Chicago, Ill.

Application July 30, 1932. Serial No. 626,541

4 Claims. (Cl. 5—118)

The present invention has for its object the provision of simple and novel means whereby an automobile owner shall be able quickly and easily to set up a comfortable bed within the automobile without being required to carry about anything more than a small compact bundle of parts that may readily be stored in or about the automobile when the bed is not in use.

In carrying out my invention I construct a frame of strong, light tubing, each end member of which is conveniently made in one piece, while the side members are preferably in sections. The various separate elements of which the frame is composed are united by simple slip joints so disposed that separation of the two elements meeting in any one of the joints is effected by moving such elements relatively in the direction to widen or lengthen the frame. Then, by tying the members of the frame together, the frame is locked against collapsing, without the use of bolts or other fastenings at the joints. The tie may conveniently be in the form of a panel of canvas or other strong flexible material which serves also as the mattress support; whereby the stretching of the mattress support across the frame, after the parts of the latter have been joined together, causes the frame to be secured against separation into its various parts.

The frame is supported from the sides of the automobile body by hooks or hangers carried by the side members of the frame and adapted to be interlocked with suitable fittings attached to or forming part of the automobile body; the frame being locked in place by simply engaging the hooks or hangers with the fittings on the body. These fittings, when built into the body of an automobile, need be visible only as a plurality of openings; whereas, if they are applied to a finished body, they need not project so as to form obstructions and, indeed, will hardly be noticeable.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a bed embodying the present invention, set up, ready for use, in an automobile; Fig. 2 is a view of the automobile partly in side elevation and partly in section, showing the bed; Figs. 3, 4 and 5 are sections, on a larger scale, on lines 3—3, 4—4 and 5—5, respectively, of Fig. 1; Fig. 6 is a section taken approximately on line 6—6 of Fig. 2, the mattress being shown in elevation; Fig. 7 is a section on the same scale as Figs. 3 to 5, on line 7—7 of Fig. 1; Fig. 8 is an elevation looking toward the parts appearing in Fig. 7 from the right-hand side of Fig. 7; Fig. 9 is a section, on the same scale as Fig. 7, on line 9—9 of Fig. 1; and Fig. 10 is a view similar to Fig. 8 showing, however, the parts appearing in Fig. 9.

Referring to the drawings, 1 and 2 represent two tubular end members of a frame each side member of which is composed of two tubular sections 3 and 4. The end members have elbows 5 on the ends thereof. The ends of the side members of the frame are entered into and have sliding fits in the corresponding elbows. Consequently, the frame may be taken apart by simply moving the end members away from each other. The two sections of each side member of the frame are also connected together by slip joints. As best shown in Fig. 5, each of the sections 3 has fixed into an end thereof a cylindrical plug 6 which projects a considerable distance beyond the same. This plug enters the adjacent end of the cooperating tubular section 4 when the frame is set up.

Associated with the frame is a mattress support which is conveniently in the form of a long, wide sheet of canvas 7 folded and stitched along three edges to provide tubular portions 8 to receive one of the end members and the two side members of the frame. In the arrangement shown, the end member 1 of the frame extends through the tubular part at one end of the mattress support, so that the mattress support may remain permanently attached to this frame member. The side members of the frame are slipped into the tubular parts of the mattress support along the side edges of the latter when the bed is being set up and are again withdrawn when the bed is collapsed or knocked down. The free end of the mattress support is temporarily attached to the end member 2 of the frame in any suitable manner so as to hold the mattress support taut and cause it to act as a tie between the two end members of the frame and thus prevent the parts of the frame from separating from each other. In the arrangement shown, a lacing 9 zig zags from the free edge of the mattress support to and around the frame member 2 from one end of this member to the other.

When the parts of the frame are brought together, as explained, and the lacing is applied and tightened, the bed is ready for use upon laying a mattress A upon the same and providing suitable pillows B.

The parts of the frame are so proportioned that, when the frame is placed in the upper part of an automobile body, it extends into proximity to both of the side walls and from a point near the rear wall to a point near the front end of the body. All that is necessary, therefore, is to provide means for effectively supporting the frame from the walls of the automobile body without marring the appearance of the latter or creating projections or protuberances that will be objectionable. I have, therefore, provided each side member of the frame with a pair of hangers or hooks so positioned that they may be engaged with proper fittings on the two intermediate door posts on the corresponding side of the automobile. These hangers or hooks may conveniently be in the form of castings 10, as shown in Figs. 7 to 10, surrounding the pipe sections 3 and 4; each having on the side that is on the outer side of the frame a pair of lugs 11 provided with heads 12. The headed ends of these lugs may be inserted through key hole slots properly placed in the sides of the automobile body so that, when the frame is thereafter lowered slightly, the hangers will be interlocked with the body of the automobile and can not become separated therefrom without first lifting up the bed. The key hole slots may be formed in any elements or on constituting parts of the automobile body; all that is necessary being that there be key hole slots behind which are cavities larger than the slots, so as to provide room for the heads or hook elements on the hangers. In the arrangement shown, the key hole slots appearing on the left-hand side of Fig. 6, indicated at 14, are formed in one of the metal walls 15 of a hollow post. This is also the arrangement shown in Figs. 9 and 10. The key hole slots occurring on the right-hand side of the body as it appears in Fig. 6 are contained in a casting 16 which is fastened to the inner face of the side wall of the automobile body. The castings 16 are considerably thicker than the heads 12 so that the key hole slots 17 may appear in the front portions of the castings and the cavities 18 in the rear portions.

There are preferably two hangers or hooks on each side of the bed frame. The side members of the frame possess sufficient resiliency to permit the frame to be narrowed in the act of engaging the hangers or hooks in the key hole slots or the act of disengaging the hangers or hooks from these slots.

It will be seen that, when the hangers are interlocked with the sides of the car body, they hold the frame against spreading or contracting transversely. Therefore, the elbows 5 need not be fixed to the end members of the frame but may be simply slipped upon the latter so that, when the frame is knocked down, the elbows are separated not only from the side members but also from the end members of the frame.

In the ordinary types of automobile bodies the door posts will be so located that a considerable portion of the head end of the bed will extend rearwardly beyond the rear posts, and it is therefore desirable that additional means be provided for supporting the head end of the bed. This may conveniently be done by means of a pair of legs in the form of tubes 19 each having at one end a T fitting 20. These fittings may be screwed or otherwise fixed to the legs and have the internal bore of the tube cross pieces of such a diameter that the side members of the frame may be inserted in the same and be a sliding fit therein. These legs are made long enough to rest upon some underlying part of the body of the automobile when the bed is set up. In the arrangement shown, the legs are adapted to rest at their lower ends upon the floor 21 below the rear seat cushion 22. Before the bed is set up the cushion 22 is drawn forward so as to leave behind it a space through which the legs may pass.

It will be seen that, when the bed has been set up in the automobile, the frame is held against spreading in either direction by means of the mattress support. Any looseness or slack that may develop in this support lengthwise of the bed may, of course, be compensated by the lacing that connects it to the end member at the foot of the bed. Although there is no means for taking up slack crosswise of the mattress support, this is not important because, after the hangers have been interlocked with the side walls of the automobile body, the side members of the bed frame can not move neither toward nor away from each other and will, therefore, be held in their proper positions relatively to each other and to the end members of the frame independently of the mattress support.

In the manufacture of automobile bodies they may be provided with the key hole slots, as shown in Figs. 9 and 10, and at the left-hand side of Fig. 6. Where car bodies have not been thus prepared in the factory, it is a simple matter for a car owner to attach the little castings or plates 16, such as shown in Figs. 7 and 8 and at the right-hand side of Fig. 6. Furthermore, since, aside from the hangers and the supporting plates, the bed consists simply of plain tubing, elbows, a piece of canvas and a rope for the lacing, any one desiring to make and use one of my improved beds can do so at small expense as long as he can purchase a set of fixtures consisting of four hangers and four supporting plates or castings. The hangers need not be fastened to the tubing of the frame, but may be and preferably are simply slipped loosely upon the same, so that no skill is required in registering the hangers accurately with the supporting plates or castings after the latter have been screwed or otherwise fastened to the car body; the hangers being simply slid along the side members of the frame until they properly register with the stationary supporting plates or castings.

Heretofore I have said that the mattress support may remain permanently on the end frame member 1. This is, of course, not necessary as the member 1 may be separated from the mattress support in the same way as are the side members of the frame, when the bed is taken down.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, an automobile having in the inner sides of the side walls cavities opening out into the interior of the automobile through smaller mouths, a bed about as wide as the interior of the automobile and of a length no greater than the interior length of the automobile, and elements on the sides of the bed in position to pass into the said cavities through the mouths thereof, said elements having heads at their free ends to interlock the elements with the side walls when the bed is moved down a short distance after said elements have been inserted in said cavities.

2. The combination with a tubular bed frame, of blocks loosely surrounding at least some of the elements of the frame, each of said blocks having at the outer edge hook-like lugs arranged one above the other.

3. The combination with a tubular bed frame, of blocks loosely surrounding at least some of the elements of the frame, each of said blocks having at the outer edge short lugs lying one above the other and projecting outwardly from the block, each lug having a head at its free end.

4. A supporting fixture for a bed frame comprising a block having a hole through the same for the passage of a tubular bed frame member, headed lugs on an edge of the block arranged one above the other in a plane at right angles to the axis of said hole, and a plate having in a face key hole slots to receive said lugs and cavities behind said slots to receive the heads on the lugs.

EDWIN WESSMAN.